United States Patent [19]

Czech

[11] Patent Number: 4,875,604

[45] Date of Patent: Oct. 24, 1989

[54] DISPENSER FOR PASTE-LIKE PRODUCTS

[76] Inventor: Joachim Czech, Jahnstrasse 19, D-8402 Donaustauf, Fed. Rep. of Germany

[21] Appl. No.: 253,956

[22] Filed: Oct. 3, 1988

Related U.S. Application Data

[63] Continuation of Ser. No. 2,800, Jan. 13, 1987, abandoned.

[30] Foreign Application Priority Data

Jan. 17, 1986 [DE] Fed. Rep. of Germany ....... 3601311

[51] Int. Cl.$^4$ ............................................... G01F 11/00

[52] U.S. Cl. .................................... 222/257; 222/321; 222/340; 222/378; 222/379; 222/380; 222/383; 222/387; 222/401

[58] Field of Search ................................ 222/256–260, 222/321, 378, 379, 380, 383, 384, 386, 387, 401, 402, 340; 417/545, 547, 551

[56] References Cited

U.S. PATENT DOCUMENTS

| | | | |
|---|---|---|---|
| 3,146,920 | 9/1964 | Benjamin | 222/340 X |
| 3,282,472 | 11/1966 | Roder | 222/321 |
| 4,485,943 | 12/1984 | Czech | 222/383 X |
| 4,511,068 | 4/1985 | Bossina | 222/387 X |
| 4,515,298 | 5/1985 | Czech | 222/380 |
| 4,561,571 | 12/1985 | Chen | 222/383 X |
| 4,565,306 | 1/1986 | Nakanishi et al. | 222/401 X |
| 4,685,594 | 8/1987 | Czech | 222/321 X |

FOREIGN PATENT DOCUMENTS

| | | | |
|---|---|---|---|
| 221750 | 9/1924 | United Kingdom | 222/383 |

*Primary Examiner*—Joseph J. Rolla
*Assistant Examiner*—David H. Bollinger
*Attorney, Agent, or Firm*—Scully, Scott, Murphy & Presser

[57] ABSTRACT

The invention relates to a dispenser for paste-like products which is characterized by a particular simple construction of its dispensing mechanism requiring a reduced number of components. Integrally connected to a supply container of the dispenser is a cylinder body slidably supporting a dispensing piston connected to an actuator cap guided on the cylinder body. The dispensing piston cooperates with the cylinder body to define a pump chamber communicating with the interior of the supply container through a non-return valve. On the other side the bottom portion of the dispensing piston is provided with a non-return valve for establishing communication of the pump chamber with a tubular section carrying the dispensing piston and at the same time acting as an outlet passage for the paste-like product. The tubular section is integrally connected to the actuator cap, the latter being biased towards a rest position by a return spring supported on a fixed counterstop, particularly on the cylinder body.

19 Claims, 4 Drawing Sheets

DISPENSER FOR PASTE-LIKE PRODUCTS

This application is a continuation, of application Serial No. 002,800, filed 1/13/87, now abandoned.

BACKGROUND

The present invention relates to a dispenser for paste-like products, comprising a substantially cylindrical container for containing said product, a follower piston slidably engaging the interior wall surface of said container for displacement therealong by the action of the outer atmospheric pressure, and a headpiece disposed on the upper end of said container and containing a manually operable dispensing mechanism including a dispensing piston and a product outlet passage adapted to be communicated with said container.

Dispensers of this type are known a portable supply containers for use in numerous applications, such as body care applications, medical applications for dispensing medical compositions, or for the storage and sale of paste-like alimentary products.

A corresponding variety of such dispensers is therefore available for containing paste-like products of widely varying nature, this diversification being particularly evident with regard to respective dispensing and operating mechanisms.

Conventional dispensers having a container and a headpiece disposed on top thereof and containing a piston-operated dispensing mechanism and an actuator element therefor suffer from the disadvantage, however, of a relatively complicated construction of the headpiece, particularly as regards the dispensing mechanism and its connection to an outlet passage for the paste-like product, resulting in relatively high manufacturing and assembly costs for these components, and thus in an increased price for the dispenser impairing its ability to compete with other supply containers for paste-like products such as collapsible tubes.

SUMMARY

It is therefore an object of the invention to provide a dispenser of the type defined in the introduction, which is characterized by a considerably reduced number of separate components and a resultant reduction of manufacturing and assembly expenses as compared to conventional dispensers, so as to considerably improve the economic aspects in the manufacture of the dispenser while maintaining its usefulness. The dispenser should additionally be characterized by high reliability and simple operability.

In accordance with the characterizing features of the invention, this object is attained according to the invention by the provision that the headpiece comprises a hollow cylinder body extending from the upper end wall of the container, and a cup-shaped actuator cap slidably mounted on and surrounding the hollow cylinder body for axial displacement thereon, and including an integrally formed inner tubular section forming the outlet passage and acting as a carrier element for the dispensing piston, the latter being formed with an entry opening of the outlet passage and being slidably guided in the hollow cylinder body for displacement therein by means of the actuator cap, a pump chamber defined by the dispensing piston in the hollow cylinder body being adapted to be communicated with the container or with the outlet passage, respectively, in response to displacement of the actuator cap.

The advantages achieved by this solution with regard to a simplified construction requiring a reduced number of readily assembled separate components are based on the design of the headpiece substantially consisting of only two main components, namely, the hollow cylinder body and the actuator cap slidably guided thereon, each of these main components being of a multifunctional design and characterized by a sturdy construction to thereby ensure high reliability of the dispenser during extended use. Integrally combined in the construction of the actuator cap are the functions of extracting the paste-like product from the container, delivering the product to the exterior through an outlet passage, actuating the dispensing mechanism and sealingly closing the top end of the container. The hollow cylinder body is effective to determine the available volume of the pump chamber and thus essentially the amount of the product dispensed by each stroke of the dispensing piston, to act as a guide for the sliding displacement of the actuator cap and as a support for a return means for the actuator cap, and may additionally form a seat surface for a closure cap of the dispenser adjacent its connection to the container. As an additional advantage, at least part of the hollow cylinder body may be formed integrally with the container to thereby further reduce the number of assembly steps during manufacture of the dispenser.

An advantageous embodiment of the dispenser according to the invention may be obtained by the provision that respective non-return valves are provided to cooperate with an opening formed in a bottom wall of the dispensing piston and with an opening formed opposite thereto in the top end wall of the container, so that the pressure-controlled closure members are disposed adjacent the top and the bottom, respectively, of the pump chamber.

In an embodiment in which the non-return valve is incorporated in the bottom wall of the dispensing piston, the latter may be of a simple cup-shaped configuration secured to the tubular section of the actuator cap by a snap connection.

In connection with a non-return valve closure member formed integrally therewith, the dispensing piston may in a simple manner be formed integrally with a corresponding portion of the tubular section of the actuator cap.

Further advantageous embodiments relating to the positioning of the outlet passage within the actuator cap so as to extend therethrough, and to the connection of the dispensing piston to the actuator cap in combination with simplified constructions of the non-return valve at the bottom wall of the dispensing piston.

A design of the hollow cylinder body satisfying any requirements regarding the sliding guidance of the dispensing piston as well as the mounting of the actuator cap is set forth in another embodiment, wherein the construction of the outer sleeve as an integral extension of the container effective to slidably guide and retain the actuator cap provides for the simple accommodation of a return spring biasing the actuator cap towards its rest position and favours the desired reduction of the number of separate components required for the dispenser. Further preferred embodiments relating to the configuration of the pump chamber and to the mechanical retention of the actuator cap are also disclosed.

Further advantageous embodiments of the dispenser according to the invention relate for instance to a complete integration of the hollow cylinder body with the container to form an integral structural component, with the result of an advantageous further simplification of the overall construction of the dispenser.

BRIEF DESCRIPTION OF THE DRAWINGS

Embodiments of the invention shall now be described by way of example with reference to the accompanying drawings, wherein.

DETAILED DESCRIPTION

Figure 1:
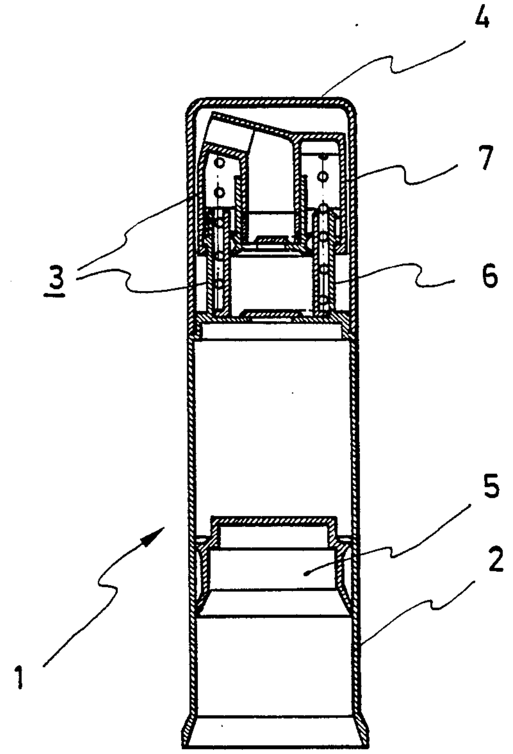
FIG. 1 shows a longitudinal sectional view of a dispenser according to a first embodiment of the invention.

Depicted in FIG. 1 is a first embodiment of the invention showing the main components of a dispenser 1 for pastelike products, for instance toothpaste, these main components being a cylindrical container 2, a headpiece 3 extending therefrom, a closure cap 4 for sealingly closing the dispenser, and a follower piston 5 slidably mounted for displacement within container 2. Headpiece 3 is composed of a cylinder body 6 and an actuator cap 7. The individual components of dispenser 1 are made of an injection-mouldable plastic, preferably polyethylene or polypropylene, so that on the one hand dispenser 1 is of a lightweight construction, and on the other hand the paste-like product filled into container 2 of dispenser 1 is unaffected by the material of dispenser 1. The paste-like product is advanced within container 2 by the displacement of follower piston 5 along the interior wall surface of container 2 by the action thereon of the surrounding atmospheric pressure, so that container 2 is emptied form bottom to top during use of dispenser 1. In this manner the supply of the paste-like product within container 2 towards a dispensing mechanism incorporated in headpiece 3 is ensured in a simple manner, and the generation of a vacuum within container 2 by dispensing the paste-like product from dispenser 1 as well as the entry of outside air to the interior of container is avoided.

Cylinder body 6 of headpiece 3 is offset radially inwards of the peripheral wall of container 2 to thereby form a seat for closure cap 4, permitting it to be seated on container 2 in alignment with its peripheral wall surface, so that dispenser 1 as a whole has a smooth cylindrical outer shape.

Figure 2:
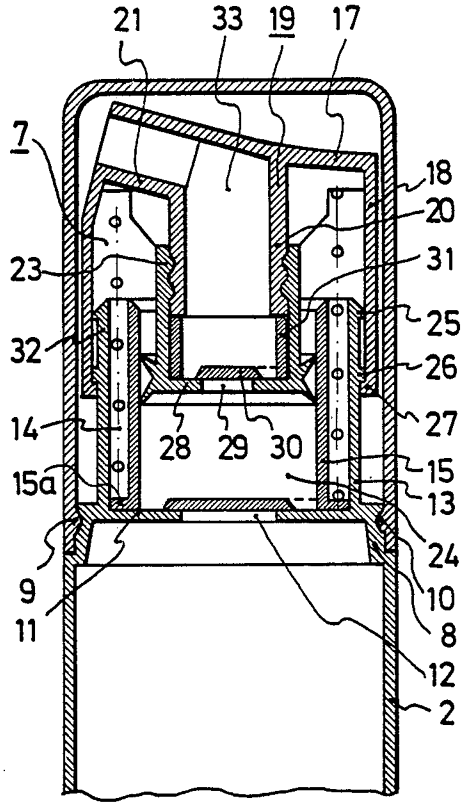
FIG. 2 shows an enlarged illustration of a headpiece of the dispenser shown in FIG. 1.

Details of the first embodiment shall now be explained with reference to FIG. 2, showing an enlarged illustration of headpiece 3 of FIG. 1 including closure cap 4, together with a more detailed illustration of the components of this embodiment.

As shown in FIG. 2, the upper end of container 2 is formed with a shoulder 8 defining a peripheral surface with a detent groove 9 acting as a seat surface for closure cap 4, the latter being formed with an interior annular projection 10 to be received in groove 9 as dispenser 1 is being closed, so that closure cap 4 and container 2 are united with their peripheral wall surfaces in alignment without a gap therebetween. The top end of shoulder 8 is defined by an end wall 11 formed with a central opening 12.

Integrally formed with end wall 11 and extending axially therefrom is an outer sleeve 13 as a basic element of cylinder body 6 forming an axial extension of container 2. The outer diameter of outer sleeve 13 is smaller than that of container 2 to provide sufficient clearance for the sliding displacement of actuator cap 7 and for the application of closure cap 4 in coaxial alignment with container 2. An annular space 14 is defined within outer sleeve 13 by an inner sleeve 15 inserted thereinto with its bottom end resting on end wall 11. The bottom end portion of inner sleeve 15 is formed with a peripheral outer shoulder 15a of a radial width corresponding to that of annular space 14 for centering inner sleeve 15 within outer sleeve 13. Inner sleeve 15 is substantially designed in the shape of a cup, a central bottom portion of which is formed as a closure flap 16 covering opening 12 of end wall 11 and cooperating therewith to form a non-return valve. Closure flap 16 is preferably cut from the bottom portion of inner sleeve 15 along part of its periphery and hingedly connected to the remainder of said bottom portion by an integral material web. This connection permits closure flap 16 to be pivoted in one direction when a pressure within container 2 adjacent opening 12 exceeds a pressure prevailing above closure flap 16.

Outer sleeve 13 cooperates with inner sleeve 15 to form guide and retention means for actuator cap 7 simultaneously acting as the dispensing mechanism of dispenser 1.

Actuator cap 7 is of a generally cup-shapee configuration comprising a bottom wall 17 and an annular outer wall 18. Within the space defined by bottom wall 17 and outer wall 18 actuator cap 7 is provided with a tubular section 19 itself composed of two distinct portions, namely, an axially extending and centrally located piston carrier tube 20, and a dispensing pipe 21 extending therefrom at an obtuse angle adjacent bottom wall 17 of actuator cap 7. Secured to piston carrier tube 20 is a dispensing piston 22 provided to this purpose with a hollow cylindrical extension 23 projecting axially into actuator cap 7. The outer diameter of piston 22 is dimensioned so that piston 22 is in sealingly slidable engagement with inner sleeve 15.

Outer sleeve 13 is formed with upper and lower annular projections 25, 26, the peripheral surfaces of which form a guide surface for the interior surface of outer wall 18 of actuator cap 7. A lower end portion of actuator cap 7 is formed with an inwards projecting annular rim 27 cooperating with annular projection 26 of outer sleeve 13 to retain actuator cap 7 on outer sleeve 13 while permitting it to be axially displaced for actuating dispenser 1.

The sealingly slidable engagement of dispenser piston 22 with the interior wall surface of inner sleeve 15 results in the formation of a pump chamber 24 between a bottom portion 28 of dispenser piston 22 and closure flap 16, the volume of pump chamber 24 being variable in response to axial displacement of actuator cap 7 and thus dispensing piston 22. Bottom portion 28 of dispensing piston 22 is formed with an opening 29 covered by a closure flap 30 within piston 22. Closure flap 30 is integrally formed with and hingedly connected to a valve sleeve 31 inserted into dispensing piston 22 and cooperates with opening 29 to form a non-return valve. Valve sleeve 31 is inserted into tubular cylindrical extension 23 of dispensing piston 22 and has closure flap 30 integrally connected thereto by a web acting as a hinge.

Dispensing piston 22 is secured to piston carrier tube 20 by a snap connection.

Disposed in annular space 14 between inner sleeve 15 and outer sleeve 13 is a helical spring 32 acting as a return spring for actuator cap 7 and held under compression between outer annular shoulder 15*a* of inner sleeve 15 and bottom wall 17 of actuator cap 7, so that in the absence of an actuating force actuator cap 7 is maintained in the position shown in FIG. 2 and determined by annular projections 26 and 27.

The outer surface of bottom wall 17 of actuator cap 7 forms an actuating surface for the application of an axially downwards directed actuating force for dispensing the pastelike product from dispenser 1 through an outlet passage 33 formed by tubular section 19.

For avoiding a disadvantageous rectangularly bent configuration of outlet passage 33, bottom wall 17 of actuator cap 7 substantially extends in an inclined plane with respect to the longitudinal axis of dispenser 1.

The above described dispenser 1 operates as follows: On the first actuation of dispenser 1, it may be assumed that only container 2 is filled with the paste-like product, so that axial depression of actuator cap 7 initially results in a "dead" stroke of piston 22 to reduce the volume of pump chamber 24. The resultant pressure rise in pump chamber 24 causes closure flap 30 of piston 22 to be lifted off opening 29 in piston bottom portion 28 to thereby permit the air to escape from pump chamber 24 through outlet passage 33. On subsequent release of the actuating force acting on actuator cap 7, return spring 32 acts to return actuator cap 7 upwards to its starting position, whereby the volume of pump chamber 24 is again increased. The resultant vacuum within pump chamber 24 causes closure flap 30 of dispensing piston 22 to return to its rest position obturating opening 29 and closure flap 16 on end wall 11 to be lifted off opening 12 to thereby permit the pastelike product to flow from container 2 into pump chamber 24 until a pressure equilibrium is established between pump chamber 24 and the interior of container 2, whereupon closure flap 16 may close again on opening 12 of end wall 11. Renewed depression of actuator cap 7 on the one hand causes the pressure acting on closure flap 16 to be increased to thereby completely interrupt communication between pump chamber 24 and the interior of container 2, and on the other hand causes closure flap 30 to be lifted off opening 29 in bottom portion 28 of dispensing piston 22, so that the paste-like product is expelled through outlet passage 33, i.e. through piston carrier tube 20 and dispensing pipe 21.

The amount of the product dispensed is thus determined by the length of the piston stroke expelling the product from pump chamber 24 through outlet passage 33. When the pressure acting on actuator cap 7 is again relieved, return spring 32 again acts to return actuator cap 7 to its rest position, the resultant vacuum in pump chamber 24 causing piston closure flap 30 to be closed, this action being assisted by the amount of the product remaining in outlet passage 33, which tends to be sucked back into pump chamber 24 as long as closure flap 30 has not yet completely closed. At the same time the vacuum generated in pump chamber 24 causes closure flap 16 between the product supply and pump chamber 24 to be opened, so that the product flows from the interior of container 2 into pump chamber 24 until the latter is again filled with the product and closure flap 16 is permitted to return to its closure position on end wall 11 by the pressure equilibrium thus established.

It is of course also possible to likewise fill pump chamber 24 with the paste-like product prior to the first actuation of dispenser 1, so that the first depression of actuator cap 7 results in the paste-like product to be dispensed from dispenser 1.

The further embodiments of the invention relate to modifications in the design of actuator cap 7 and/or inner and outer sleeves 13 and 15, respectively, without thereby relinquishing the operating principle described above. In all of these embodiments, depression of actuator cap 7 causes the paste-like product to be expelled from pump chamber 24 through outlet passage 33, while the return of actuator cap 7 to its rest position causes a charge of the paste-like product to be sucked into pump chamber 24 from supply container 2. Individual components of the embodiments shown in FIGS. 3 to 7 corresponding to ones of the first embodiment of FIG. 2 are designated by the same reference numerals.

Figure 3:
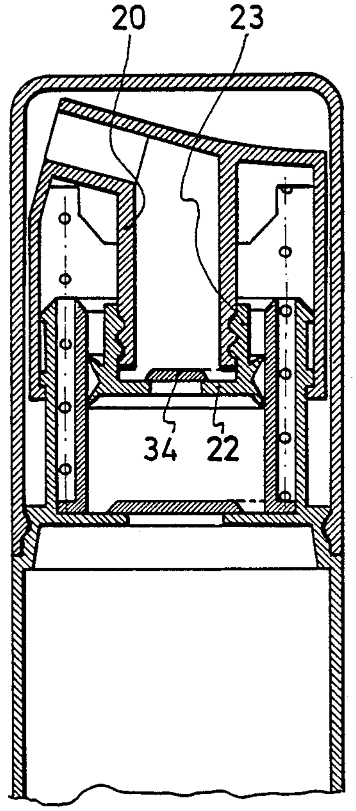
FIG. 3 shows a longitudinal sectional view of a headpiece of a dispenser according to a second embodiment of the invention.

The embodiment of FIG. 3 differs from the one shown in FIG. 2 by the absence of a valve sleeve inserted into dispensing piston 22, in place of which a non-return valve is formed by the cooperation of opening 29 in bottom portion 28 of dispenser piston 22 with a closure member 34 formed integrally with piston carrier tube 20 as a hinged flap projecting at right angles radially inwards. This arrangement results in closure member 34 being reliably biased in the closing direction for obturating opening 29 in bottom wall 28 of dispensing piston 22.

Figure 7:
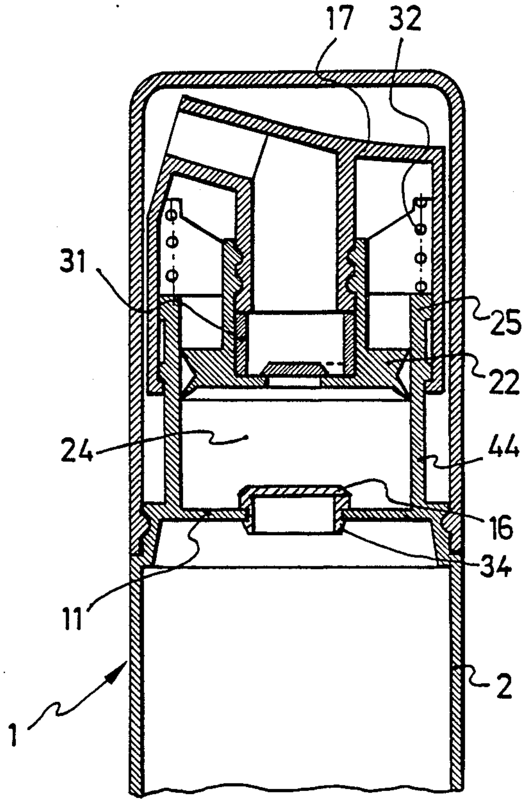
FIG. 7 shows a longitudinal sectional view of the headpiece of a dispenser according to a fifth embodiment of the invention.

Alternatively it is also possible to insert a separate non-return valve similar to the closure of container opening 12 shown in FIG. 7 into opening 29. The omission of valve sleeve 31 permits piston carrier tube 20 to be extended to a location close to the interior surface of piston bottom 28, so that hollow cylindrical extension 23 of dispenser piston 22 may be made shorter.

Figure 5:
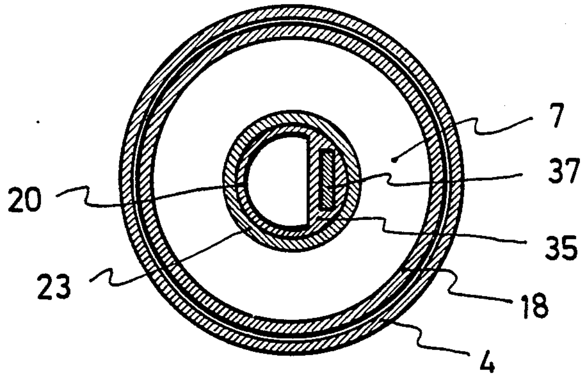
FIG. 5 shows a cross-sectional view taken along the line I—I in FIG. 4.
Figure 4:
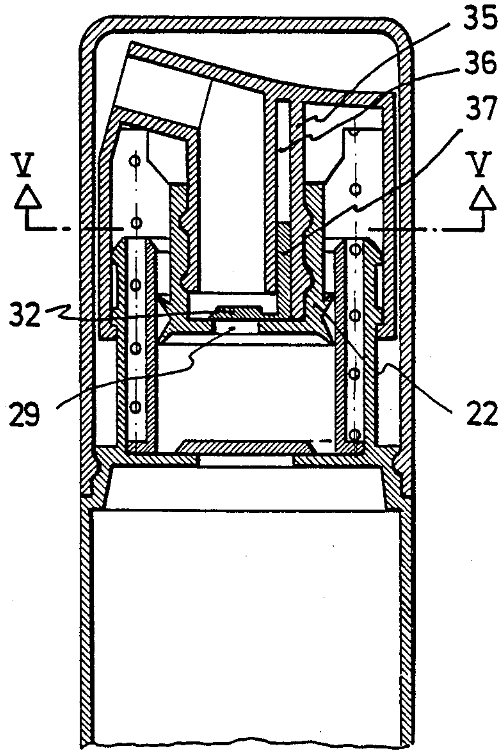
FIG. 4 shows a longitudinal sectional view of a headpiece of a dispenser according to a third embodiment.

A further embodiment shown in FIGS. 4 and 5 differs from the previous ones by a modified mounting of closure flap 32 of the non-return valve in dispensing piston 22. In this embodiment piston carrier tube 20 is formed with a thickened wall segment 35 provided with an axially extending slot 36 for receiving therein a non-circular plastic shaft 37 to which closure flap 32 is hingedly connected by an integrally formed web portion.

This solution ensures a reliable and uncomplicated positioning of closure flap 32 over opening 29 of dispensing piston 22.

Figure 6:
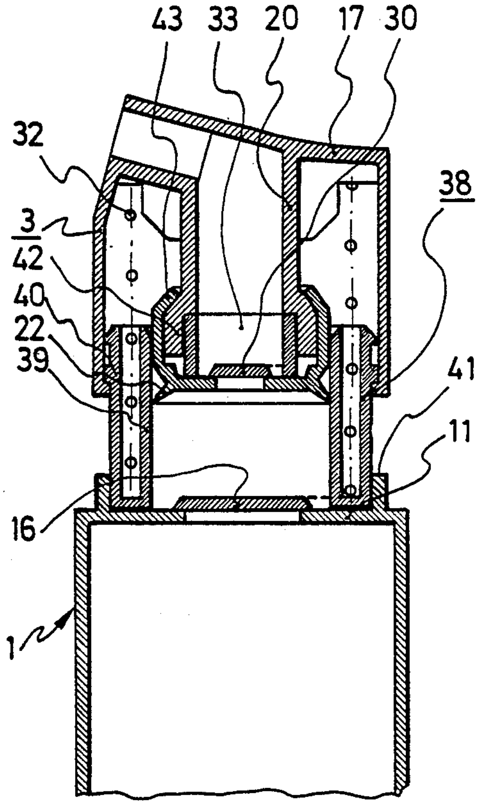
FIG. 6 shows a longitudinal sectional view of a headpiece of a dispenser according to a fourth embodiment of the invention.

FIG. 6 shows an embodiment of dispenser 1 in which a further reduction of the number of components of headpiece 3 is achieved by the provision that, by contrast to the previous embodiments, in which outer and inner sleeves 13 and 15, respectively, are separately formed components, the two sleeves are now combined in an integral component in the form of a cylinder sleeve 38 having a wall of U-shaped cross-sectional configuration comprising an inner wall 39 and an outer wall 40 with a clearance therebetween for accommodating and guiding helical return spring 32 therein. End wall 11 is provided with an integrally formed annular extension 41 in which cylinder sleeve 38 is retained in a press fit.

Also modified with respect to the embodiments shown in FIGS. 1 to 5 is the design of dispensing piston 22 and its mounting on piston carrier tube 20. In the present example the free end of piston carrier tube 20 is formed with an end portion 42 having a larger diameter than the remainder of piston carrier tube 20, so that the circumferential outer surface of piston carrier tube 20 defines an undercut portion 43, while the respective portion of the interior wall surface of piston carrier tube 20 forms a shoulder.

Inserted into enlarged end portion 42 is a valve sleeve 31 similar to the one shown in FIG. 2, serving as a hinged mounting for closure flap 30 of the piston non-return valve and at the same time covering the shoulder inside piston carrier tube 20, so that the flow resistance for the paste-like product is not increased at this location of outlet passage 33.

Dispensing piston 22 is designed in such a manner that hollow cylindrical extension 23 forms an integral part of the piston sealing surface slidably engaging inner wall 39 of cylinder sleeve 38 together with an upstream sealing lip of dispensing piston 22.

Hollow cylindrical extension 23 is formed with a restricted annular end portion 44 for snap-engagement with undercut portion 43 defining enlarged end portion 42 of piston carrier tube 20. This arrangement permit dispensing piston 22 to be mounted on piston carrier tube 20 by simply pushing it thereonto, and to be subsequently positively retained thereon, the position of piston 22 in the thus mounted state being defined by valve sleeve 31 or shoulder 42, respectively.

In addition to the simplified mounting in actuator cap 7 of all components required for dispensing the paste-like product, this embodiment offers the advantage of an improved stability and guidance of actuator cap 7 due to the greater dimensions of the piston sealing surface. The outer guidance of actuator cap is achieved independently thereof in a similar manner as in the previous embodiments by the employ of annular projections 25 and 26 formed in this case on outer wall 40 of cylinder sleeve 38.

Closure flap 16 of the non-return valve at the top of container 2 may be formed as a separate closure member or connected by a web portion to inner wall 39 of cylinder sleeve 38.

This embodiment may be further simplified by omitting annular extension 41 for the mounting of cylinder sleeve 38 and by forming the double-walled cylinder sleeve 38 integrally with end wall 11 of container 2.

In this embodiment the handling of dispenser 1 is further facilitated by the provision that the portion of bottom wall 17 of actuator cap 7 receiving the actuating force for operating dispenser 1 is inclined in opposite directions, so that a finger used for actuation is guided to the center of the outer bottom wall surface for uniform application of the actuating force to actuator cap 7.

Also in this embodiment the dispenser operates in the manner described with reference to FIG. 2

A further simplified construction of the dispensing mechanism of dispenser 1 is shown in FIG. 7. In this case a double-walled construction of cylinder body 3 in the form of separate inner and outer sleeves or in the form of a double-walled cylinder sleeve for guiding dispensing piston 22 is omitted, in place of which a single guide sleeve 44 is integrally formed with end wall 11 of container 2, the inner wall surface of guide sleeve 44 serving for slidably guiding piston 22, while its outer wall surface is designed to guide and retain annular wall 18 of actuator cap 7 thereon. THe mounting of dispensing piston 22 on piston carrier tube 20 is of the same construction as in FIG. 2. The annular top end face of guide sleeve 44 is of an increased width due to the presence of upper annular projection 25 to act as a support surface for helical spring 32, the other end of which is supported by bottom wall 17 of actuator cap 7. The outer diameter of helical spring 32 is selected so that the interior surface of annular wall 18 of actuator cap 7 acts as a guide for spring 32, the bottom wall of actuator cap 7 being optionally formed with an annular groove for centering spring 32.

This solution characterized not only by the greatest possible simplification of the construction of all components, but also by increasing the volume of pump chamber 24 to a maximum, this volume being of course effective to determine the amount of the product dispensed by a single operation of actuator cap 7. This embodiment of dispenser 1 is thus particularly suited for metering and dispensing relatively greater amounts of the paste-like product.

Apart from the valve components for the two non-return valves, this embodiment of dispenser 1 essentially consists of only three separate components, namely, container 2 with guide sleeve 44, dispensing piston 22, and actuator cap 7, these components being adapted to be readily assembled with helical spring 32 interposed therebetween. At the same time this small number of headpiece components ensures reliable and accurate metering and dispensing of the paste-like product from container 2 through outlet passage 33. The assembly of this dispenser is thus extremely simple, merely requiring the snap-fit mounting of dispensing piston 22 on piston carrier tube 20 with valve sleeve 31 interposed therebetween, and the mounting of actuator cap 7 on guide sleeve 44. Closure flap 16 of the non-return valve at the bottom of pump chamber 24 is preferably formed integrally with and hingedly connected to a sleeve 34 mounted in opening 12 of end wall 11 of container 2 by a simple snap fit mounting. As in this embodiment the volume of pump chamber 24 is substantially increased, the discharge of the correspondingly increased volume of the paste-like product may be expedited by substantially increasing the diameter of piston carrier tube 20 and thus the available volume of outlet passage 33, whereby the construction of dispensing piston 22 is similar to that shown in the other figures.

Dispensing piston 22 may also be formed integrally with piston carrier tube 20, so that its hollow cylindrical extension 23 can be omitted. In this case closure flap 30 is integrally hinged to bottom portion 28 of dispensing piston 22 at the inner side thereof. Within the basic concept of the invention the dispenser may be further modified, for instance by replacing helical spring 32 with a resilient plastic ring or a similar injection-moulded member of a type similar to the remaining components of dispenser 1. The construction of the non-return valves at the top of container 2 and within dispensing piston 22 may also be modified with a view to the nature and consistency of the paste-like product to be dispensed. The dispenser may be used for any application concerned with the metered dispensing of paste-like products, such as for medical applications, cosmetic and body care applications, domestic applications or for dispensing paste-like alimentary products.

The invention thus considerably simplifies the construction of a dispenser for paste-like products comprising a dispensing piston mechanism for extracting and dispensing the product from a supply container, without thereby impairing the reliability and metering accuracy of a dispenser of this type. The actuator cap with its dispensing piston combines the metering and dispensing functions with the actuating function of the dispenser, resulting in a simple and compact construction of the headpiece of the dispenser in combination with a simplification of the construction of individual components and a reduction of their number. The invention thus results in a noticeable reduction of the manufacturing costs for the dispenser while ensuring its usefulness.

I claim:

1. A dispenser for paste-like products comprising a cylindrical container for storing a supply of paste-like products to be dispensed, said cylindrical container including a bottom portion having a slidable follower piston and upper portion having a dispensing means for dispensing the paste-like product, said dispensing means comprising:

(a) a first non-return valve (16) provided in an upper partition wall of the cylindrical container for controlling communication between the interior of the container and a pump chamber through a first opening (12) formed in said partition wall (11);

(b) a guide sleeve arrangement (6) surrounding said first opening (12) and having first non-return valve (16) hingedly connected thereto, said guide sleeve arrangement extending upwardly from said partition wall to define circumferentially said pump chamber (24), said guide sleeve arrangement (6) having inner and outer circumferential guide sleeves, said first non-return valve being hingedly connected to said inner guide sleeve;

(c) a cup-shaped actuator cap (7) having a peripheral downwardly projecting outer wall portion and an inner tubular section (19), the latter forming a discharge channel having a laterally outwardly opening outlet passage, wherein:

(1) said outer wall portion of the actuator cap (7) is slidably engaged with the outer circumferential guide sleeve of the guide sleeve arrangement (6), both being provided with co-operating stop projections (26, 27) to limit axial upward movement of the actuator cap (7), (2) said outer guide sleeve being integral with said upper partition wall of said container, and providing an upper radially outwardly projecting rim portion (25) spaced from the stop projection (26) of the guide sleeve arrangement (6) to establish a circumferential guide surface engaging an inner cylindrical guide surface of the outer wall portion of the actuator cap, (3) said tubular section of the actuator cap having a downwardly extending portion having a diameter greater than that of said laterally opening outlet passage and supporting a dispensing piston (22) to keep the piston (22) slidably engaged with said inner circumferential guide sleeve of said guide sleeve arrangement (6), thereby defining a space forming the pump chamber (24), (4) said dispensing piston (22) having a second opening (29) in register with the tubular section of the actuator cap (7), (5) said second opening (29) being controlled by a second non-return valve means (3) for controlling communication between the pump chamber upstream thereof and the discharge channel of the actuator cap downstream thereof; and (d) a return spring (32) extending between a stationary portion of the inner guide sleeve and the actuator cap (7) to bias said actuator cap (7) into a rest position.

2. A dispenser according to claim 1, characterized in that said dispensing piston (22) is cup-shaped and connected to said tubular section (19) of said actuator cap (7) by a snap fit connection.

3. A dispenser according to claim 1, characterized in that said dispensing piston (22) is integrally formed with said tubular section (19) of said actuator cap (7).

4. A dispenser according to claim 1, characterized in that said downwardly extending portion of said tubular section (19) comprises an axial piston carrier sleeve (20) integrally formed with a dispensing pipe (21) forming said laterally outwardly opening outlet passage of said actuator cap (7).

5. A dispenser according to claim 4, characterized in that a bushing (31) is inserted into said dispensing piston (22) between an end face of said piston carrier sleeve (20) and an opposing interior piston surface, a bottom flap (30) cooperating with said bushing (31) to form a closure member of said second non-return valve over said second opening (29) formed in a bottom wall (28) of said dispensing piston (22).

6. A dispenser according to claim 4, characterized in that one side of said piston carrier sleeve (20) is formed with a thickened wall portion (35) including a slot (36) accommodating a mounting shaft (37) of a closure member (30) of said second non-return valve associated with said dispensing piston (22).

7. A dispenser according to claim 4, characterized in that said piston carrier sleeve comprises an end portion (42) of an enlarged diameter supporting said dispensing piston (22) thereon with a snap ring disposed adjacent one end of said dispensing piston (22) being received in an undercut portion (43) of said end portion (42).

8. A dispenser according to claim 1, characterized in that an annular space (14) between said inner and outer sleeves (15, 13) accommodates said return spring (32) having one end supported on a bottom portion (17) of said actuator cap (7).

9. A dispenser according to claim 8, characterized in that said inner sleeve (15) is of a cup-shaped configuration comprising a peripheral annular shoulder (15a) seated on said upper partition wall (11) of said container (2).

10. A dispenser according to claim 9, characterized in that said return spring is a coiled spring (32).

11. A dispenser according to claim 10, characterized in that said coiled spring (32) is seated on said annular shoulder (15a).

12. A dispenser according to claim 11, characterized in that said inner sleeve (15) has a bottom wall to which a closure member of said first non-return valve (16) cooperating with said first opening (12) of said upper partition wall (11) is integrally connected by a hinge portion.

13. A dispenser according to claim 12, characterized in that said outer sleeve (13) is integral with and offset radially inwardly from a circumferential surface of said container (2) and extends perpendicular with respect to said upper partition wall.

14. A dispenser according to claims 13, characterized in that said upper partition wall (11) is formed on an extension (8) of said container (2) having a smaller diameter than the main body of said container (2), a peripheral surface of said extension (8) forming a seat surface for a closure cap (4) of the dispenser (1).

15. A dispenser according to claim 14, characterized in that the seat surface of said extension (8) is formed with detent elements (9) for engagement with complementary elements (10) formed on said closure cap (4).

16. A dispenser according to claim 1, characterized in that in an upper end position of said actuator cap (7) an inwardly directed annular projection (27) at the end of said actuator cap (7) facing towards said container (2) is in engagement with an exterior annular projection (26) on said outer sleeve (13).

17. A dispenser according to claim 1, characterized in that said guide sleeve arrangement consists of an integrally formed guide sleeve (38) having a U-shaped wall (39, 40) in cross-section.

18. A dispenser according to claim 1 characterized in that said guide sleeve arrangement comprises a unitary guide sleeve (44) formed integrally with said container (2), the interior wall surfaces of said unitary guide sleeve defining said inner guide sleeve and acting as a sliding surface for said dispensing piston (22), and its exterior wall surface defining said outer guide sleeve and acting as a sliding and detent surface for said actuator cap (7).

19. A dispenser according to claim 18, characterized in that said unitary guide sleeve (44) comprises an upper stop collar (25) for supporting a return spring (32) biasing said actuator cap (7).

* * * * *